(12) United States Patent
Kennedy et al.

(10) Patent No.: US 6,999,490 B2
(45) Date of Patent: Feb. 14, 2006

(54) DISCHARGE IGNITER FOR A WAVEGUIDE $CO_2$ LASER

(75) Inventors: John Kennedy, Granby, CT (US); Lanny Laughman, Bolton, CT (US); Anthony DeMaria, West Hartford, CT (US); Ronald Straayer, South Windsor, CT (US)

(73) Assignee: Coherent, Inc., Santa Clara, CA (US)

( * ) Notice: Subject to any disclaimer, the term of this patent is extended or adjusted under 35 U.S.C. 154(b) by 367 days.

(21) Appl. No.: 10/624,411

(22) Filed: Jul. 21, 2003

(65) Prior Publication Data

US 2005/0018736 A1 Jan. 27, 2005

(51) Int. Cl.
*H01S 3/223* (2006.01)
*H01S 3/03* (2006.01)
*H01S 3/097* (2006.01)

(52) U.S. Cl. ............................. 372/55; 372/64; 372/86
(58) Field of Classification Search .................. 372/55, 372/64, 86

See application file for complete search history.

(56) References Cited

U.S. PATENT DOCUMENTS

| 5,140,606 A | 8/1992 | Yarborough et al. .......... 372/64 |
| 5,353,297 A | 10/1994 | Koop et al. .................... 372/64 |
| 6,192,061 B1 | 2/2001 | Hart et al. ..................... 372/87 |

FOREIGN PATENT DOCUMENTS

WO  WO 02/05396 A1  1/2002

*Primary Examiner*—Armando Rodriguez
(74) *Attorney, Agent, or Firm*—Stallman & Pollock LLP

(57) ABSTRACT

A waveguide gas laser includes an enclosure filled with a lasing gas. A ceramic block is provided with one or more waveguide channels. At least one of the waveguide channels includes an open region which is in fluid communication with a waveguide channel. Lasing gas in the enclosure fills the waveguide channels and the lateral extension. An electric field is applied across the lateral extension of the waveguide channel while simultaneously applying a smaller electric field across the waveguide channel. The electric field across the lateral extension ignites a discharge in the lateral extension that spreads into the lasing gas in the waveguide channel. The electric field across the waveguide channel is sufficient to sustain the discharge in the lasing in the waveguide channel.

19 Claims, 2 Drawing Sheets

DISCHARGE IGNITER FOR A WAVEGUIDE $CO_2$ LASER

TECHNICAL FIELD OF THE INVENTION

The present invention relates generally to gas lasers. The invention relates in particular to gas discharge ignition devices for carbon dioxide ($CO_2$) lasers.

DISCUSSION OF BACKGROUND ART

In a $CO_2$ laser, a discharge is maintained in a gaseous gain medium including $CO_2$. The discharge may be maintained by applying either a radio frequency (RF) or a continuous (DC) high voltage to the gain medium. Prior $CO_2$ lasers include a laser type generally referred to as a folded-waveguide laser. In a folded-waveguide laser, a ceramic block includes a plurality of waveguide channels arranged at an angle to each other to form the folded waveguide. The gaseous gain medium fills the waveguide and the discharge is maintained by applying the high voltage across parallel electrodes on either side of the block. A laser resonator including two end mirrors and one or more folding mirrors has a folded-resonator axis extending through the folded waveguide. Examples of folded waveguide lasers are described in U.S. Pat. No. 6,192,061.

In the folded-waveguide laser, before the discharge can be maintained in the gain-medium, it must be initiated (ignited) in some way. One commonly practiced method of discharge ignition is to apply a higher voltage to the gain medium than is required to maintain the discharge, and then reduce the applied voltage to a level that will maintain the discharge. This ignition method requires a high voltage power supply capable of initially applying a high voltage pulse or series of pulses to the gain medium to ignite the discharge, and capable of operating at the reduced voltage to maintain the discharge. Typically, pulses having a peak voltage at least twice that of the RF voltage are required. Another possible method of igniting the discharge is to utilize a glow-plug device or a spark-plug device. Either of these methods can require one or more power supplies involving electronic circuitry that is more complicated and expensive than would be required simply to provide that voltage necessary to maintain the discharge. The inclusion of the additional circuitry in the RF power supply for generating the higher voltage ignition RF pulses adds complexity and cost. It would thus be advantageous to eliminate the need for the high peak power RF pulses to ignite the discharge.

SUMMARY OF THE INVENTION

The present invention is directed to a method of operating a waveguide gas laser including an enclosure filled with a lasing gas. In one preferred embodiment, the laser includes a waveguide structure within the enclosure including a rectangular ceramic block having a plurality of waveguide channels therein. The channels are arranged at an angle to each other in a zigzag arrangement and filled with the lasing gas of the enclosure. In one aspect, the method of the present invention comprises providing a lateral extension in at least one of the waveguide channels. The lateral extension extends from a wall of the waveguide channel laterally into the ceramic block and is in gaseous communication with the waveguide channel and accordingly is also filled with the lasing gas of the enclosure. A first electric field is applied across the lateral extension of the waveguide channel and a second electric field smaller than the first electric field is simultaneously applied across the waveguide channel.

The first electric field is sufficient to ignite a discharge in the lasing gas in the lateral extension of the waveguide at the lasing gas pressure, and the gaseous communication between the lateral extension and the waveguide channel is sufficient that a discharge ignited in the lateral extension spreads into the lasing gas in the waveguide channel. The second electric field is sufficient to sustain the discharge in the lasing gas in the waveguide channel at the lasing gas pressure.

In one preferred embodiment, an igniter electrode is provided which is located in a blind hole aligned with the lateral extension. The spacing between the electrodes used to energize the gas in the waveguide channel is larger than the spacing between the end of the igniter electrode and the opposed waveguide electrode. By this arrangement, the electrical field in the lateral extension will be higher than in the waveguide channel thereby facilitating the ignition of the discharge.

The inventive method provides that a gas discharge in waveguide channels of a folded waveguide gas laser can be ignited by energizing the laser at only a power that would be necessary to sustain the gas discharge once ignited. This offers an advantage over prior-art discharge ignition methods in that a power supply for energizing the laser does not need to incorporate special circuitry for igniting the discharge. Another potential advantage is that the discharge may be ignited faster and more predictably than is possible with prior art methods. This can be particularly advantageous for a laser operated in a pulsed mode by minimizing temporal pulse jitter and minimizing pulse energy variation between pulses. Those skilled in the art may recognize other embodiments and potential advantages of the invention from the detailed description of the invention set forth below.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
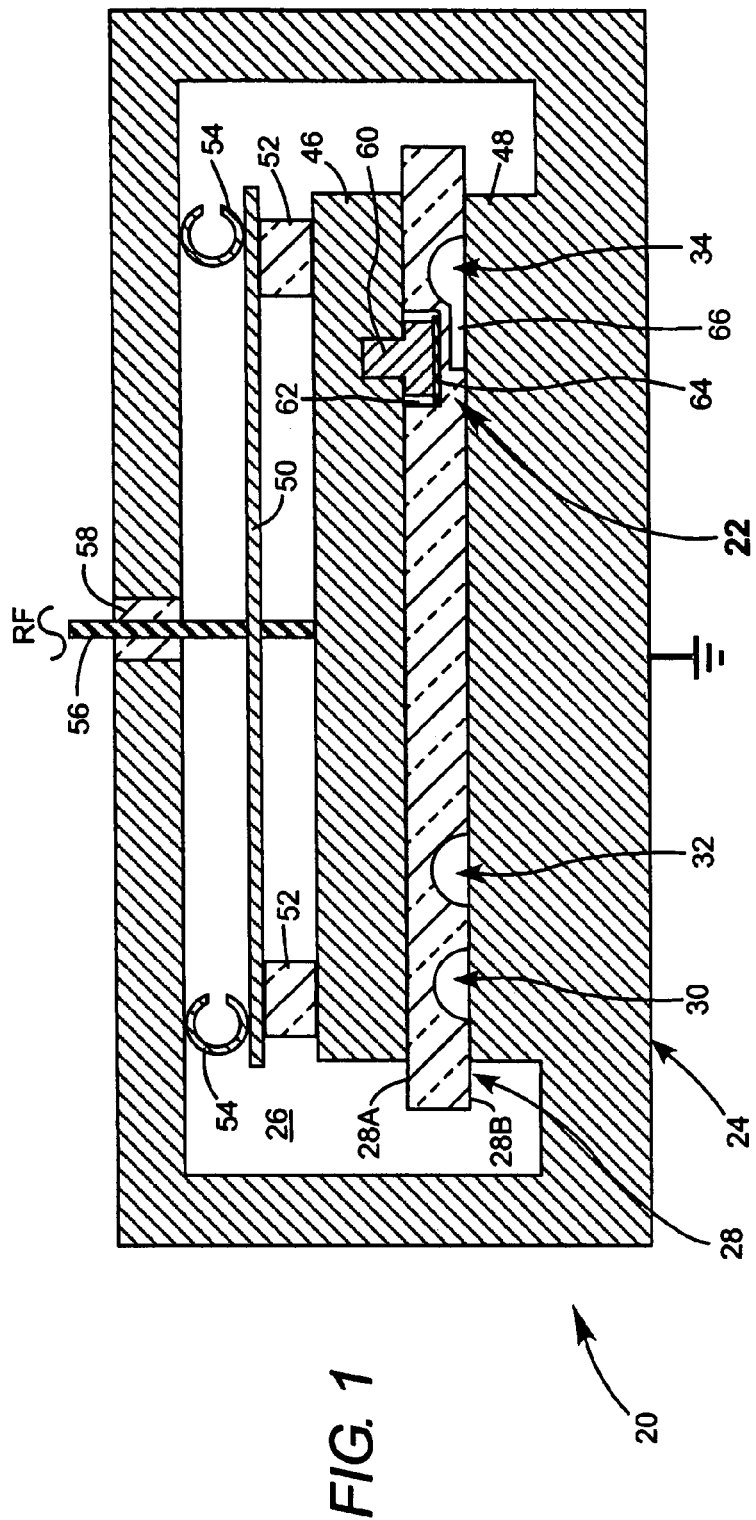
FIG. 1 is a cross-section view schematically illustrating a folded waveguide laser including one of three igniter arrangements in accordance with the present invention, the laser including a ceramic block having three waveguide channels therein.
Figure 2:
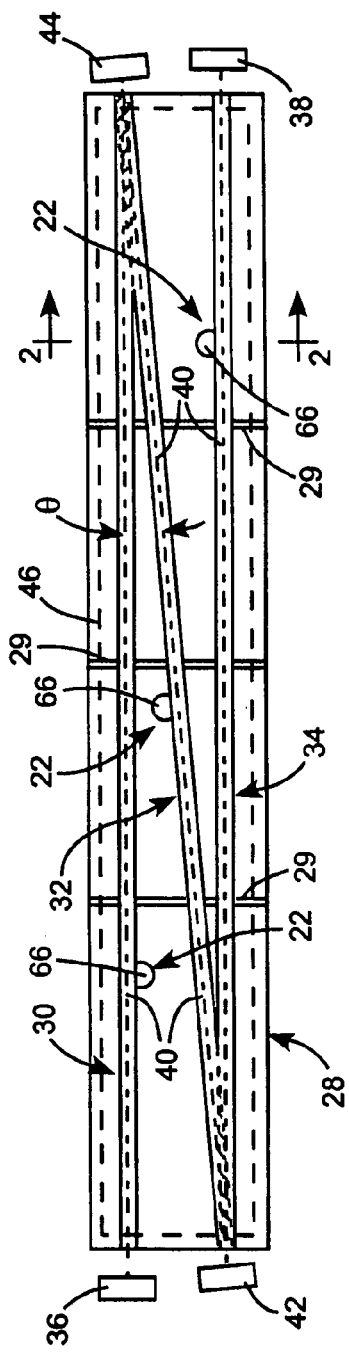
FIG. 2 is a plan view seen generally in the direction 2—2 of FIG. 1, schematically illustrating the arrangement of waveguide channels in the ceramic block of FIG. 1 and preferred positions of the igniter arrangements with respect to the waveguide channels.

Referring now to the drawings, wherein like features include like reference numerals, FIG. 1 and FIG. 2 schematically illustrate one example of a folded-waveguide $CO_2$ laser 20 including three discharge igniter arrangements 22 in accordance with the present invention. Only one of the igniter arrangements is visible in FIG. 1. Laser 20 includes a gas container 24 enclosing a lasing gas 26, here $CO_2$. An elongated ceramic slab or block 28 includes three waveguide channels 30, 32, and 34, with adjacent ones thereof inclined at an angle θ to each other. The waveguide channels are indicated here as having a semicircular cross-section. The channels however, may have another cross-section shape, such as square, rectangular, or square or rectangular with rounded corners. Preferably, one igniter arrangement 22 is provided for each channel. Pressure relief slots 29 extend across the ceramic block providing fluid (gaseous) communication between the waveguide channels. Slots 29, serve, inter alia, to enhance cross-coupling of the discharges within the waveguide channels, and thereby to encourage the discharges within the three channels to ignite at approximately the same time. It should be noted, here that only one igniter arrangement 22 is required, arbitrarily placed in association with any one of the waveguide channels, to create a discharge in that and any other waveguide channels. In this case however, discharges in the individual waveguide channels can not be expected to ignite simultaneously. It should further be noted that the inventive igniter arrangement is not limited to use in a waveguide including three waveguide channels, and may be used in waveguide lasers having more or less waveguide channels or any folding arrangement.

Gas from enclosure 26 fills the waveguide channels. A laser resonator is formed between end mirrors 36 and 38. The laser resonator is indicated in FIG. 2 by a resonator axis 40. The resonator axis is "folded" by mirrors 42 and 44 such that it extends through the waveguide channels. A gas discharge is sustained in waveguide channels 30, 32, and 34 by applying a high voltage, in this example, and RF voltage, across elongated, parallel, electrodes 46 and 48. These are referred to herein after as the discharge sustaining electrodes. Electrodes 46 and 48 are preferably in contact with opposite surfaces (sides) 28A and 28B, respectively of the ceramic block.

Electrode 46 is generally referred to as the live or "hot" electrode and covers a region of ceramic block 28 approximately indicated in FIG. 2 by dashed line 46. Electrode 48 may be referred to as the ground electrode. Ground electrode 48 is formed, in this example, by a raised portion of gas container 24, which is grounded to connect the ground electrode to ground. An LC path to ground is provided for live electrode 46 via flat-coil inductors 50. The inductors are spaced apart from electrode 46 by ceramic spacers 52 and grounded by low inductance coil springs 54 to gas container 24. RF power from a power supply (not shown) is applied to electrode 46 via a connector 56 extending through gas container 24 via an insulated feedthrough 58.

It should be noted here that only sufficient details of laser 20 for understanding principles of the inventive igniter arrangement are described herein. A more detailed description of folded-waveguide lasers in general (not including the inventive igniter) is provided in above-mentioned U.S. Pat. No. 6,192,061, the complete disclosure of which is hereby incorporated by reference. (See also U.S. Pat. Nos. 5,140,606 and 5,353,297, both of which are incorporated herein by reference.)

Figure 3:
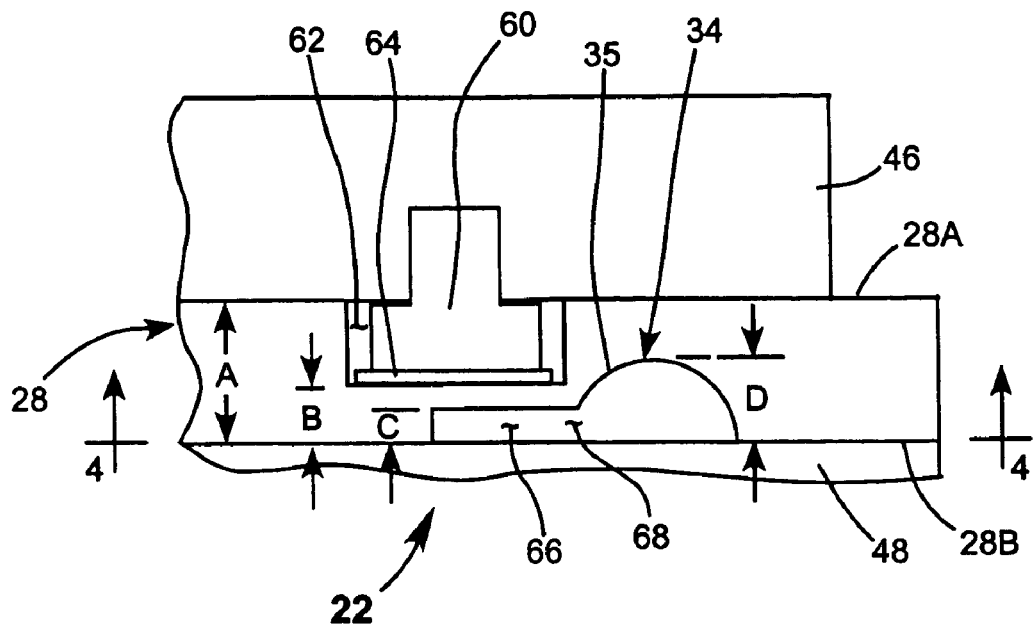
FIG. 3 is a cross section view schematically illustrating details of the igniter arrangement of FIG. 1.
Figure 4:
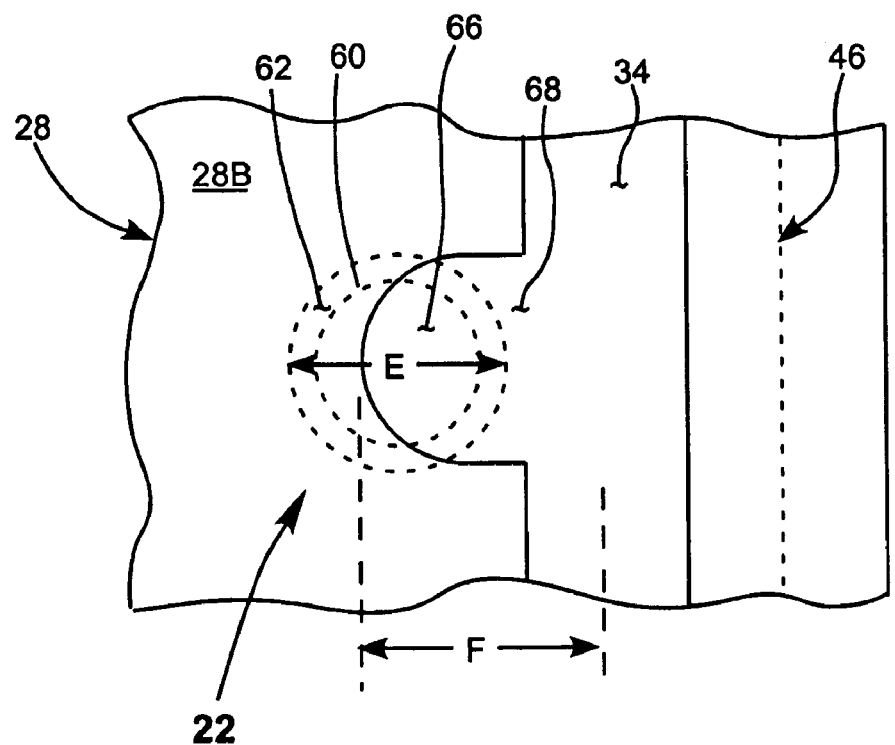
FIG. 4 is a plan view seen generally in the direction 4—4 of FIG. 3, schematically illustrating further details of the igniter arrangement of FIG. 1.

Continuing now with reference to FIGS. 1 and 2, an igniter arrangement 22 includes an igniter electrode 60. Details of the igniter arrangement including the igniter electrode are shown in FIG. 3 and FIG. 4. FIG. 3 is a cross-section view from which sectional cross-hatching is omitted for convenience of indicating relative dimensions. Igniter electrode 60, here, is in the form of a metal plug inserted into live electrode 46. Electrode 60 as a result is at the same voltage as live electrode 46. Electrode 60 extends into a hole (blind aperture) 62 in side 28A of ceramic block 28. Preferably electrode 60 is in electrical contact with the base of hole 62 to prevent arcing. This may be effected by a resilient metal connection 64, such as a spring or a soft metal disc. Further, electrode 60 is preferably a close fit in hole 62 to prevent gas breakdown in the space between electrode 60 and the side of hole 62. The dimension of this space as depicted in FIGS. 3 and 4 is exaggerated for convenience of illustration.

A part-circular recess 66 in side 28B of ceramic block 28 forms an opening 68 in wall 35 of waveguide 34 and extends in the ceramic block 28 under aperture 62 in the opposite side 28A of the block. As a result of being open to channel 34, recess 66 is filled with gas. The recess 66 forms in effect a lateral extension of the waveguide, in fluid (gaseous) communication with the waveguide, but out of the path of laser radiation circulating in the waveguide.

Applying an RF voltage across discharge-sustaining electrodes 46 and 48 creates an electric field across waveguides 30, 32 and 34. The electric field is determined, inter alia, by the applied RF voltage and the spacing A (see FIG. 3) between the electrodes. As igniter electrode 62 is electrically connected to live electrode 46 the same RF voltage will be applied across lateral extension 66 of waveguide 34 as is applied across the waveguide. However, as the spacing B (see FIG. 3) between electrode 60 and ground electrode 48 is less than spacing A, the electric field across lateral extension 66 will be higher than the electric-field across the waveguides. Preferably, the electric field across the lateral extension is equal to or greater than twice the electric field across the waveguide. Preferably, distance B is selected relative to distance A, and distance B minus C is selected relative to distance A minus D, such that an RF voltage (signal) at a power no greater than twice that required to sustain a discharge in the waveguides at a given pressure, when applied across electrodes 46 and 48, will ignite a discharge in recess 66 at the same pressure. Once the discharge is ignited in recess 66, it will spread into the waveguide channel via opening 68. Most preferably, distance B is selected such that an RF voltage at a power about equal to that required to sustain a discharge in the waveguides at a given pressure, when applied across electrodes 46 and 48, will create an electric field across lateral extension 66 sufficient to ignite a discharge at the same pressure.

Distance B is clearly less than distance A and is preferably about one half or less than distance A. Distance B minus C (the shortest distance between electrode 60 and gas in recess 66) is preferably less than distance A minus D (the shortest distance between electrode 46 and gas in channel 34) and is preferably about one half or less than distance A minus D. It should be noted that in theory at least a discharge could be ignited at a sustaining voltage without providing electrode 60 and recess 66 if distance A minus D were made sufficiently small. In practice, however this distance would need to be sufficiently small that block 28 would be unacceptably fragile.

Regarding dimensions of lateral extension 66, height C (see FIG. 3) of the extension is preferably less than height (depth) D of the waveguide. In FIG. 4 extension 66 is depicted as a having a part-circular shape, which is convenient for machining in ceramic block 28. The extension, however, may have some other shape such as a rectangle or a rounded rectangle. Generally, it is preferable to arrange dimensions of extension 66 relative to the width of the waveguide, and the position of igniter electrode 60 with respect to extension 66 and the waveguide to minimize local perturbation of the discharge in the waveguide in the region of the igniter arrangement. The lateral extension is, of course, outside the path along resonator axis 40 of laser radiation circulating in the waveguide channel.

In one example, a folded-waveguide laser including an igniter arrangement 22 in accordance with of the present invention, similar to laser 20 of FIGS. 1 and 2, ceramic slab 28 having a thickness of about 0.17 inches, a width of about 2 inches, and a length of about 11.6 inches. Electrodes 46 and 48 are spaced by the thickness of the slab (0.17 inches). Channels 30, 32, and 34 have a depth of about 0.11 inch and a width of about 0.11 inch. Hole 62 in side 28A of the ceramic slab has a diameter E of about 0.190 inches and a depth (A minus B) of about 0.120 inches. The center of hole 62 is displaced about 0.190 inches from the center of the waveguide. Recess 66 in side 28B of the ceramic slab also has a diameter of about 0.190 inches and a depth (depth C, see FIG. 3) of about 0.030 inches, with its center offset from the centerline of the waveguide channel by 0.190 inches. Igniter electrode 60 has a diameter just sufficiently less than the diameter of hole 62 that it provides a close fit for the electrode into the hole.

In this example, the spacing B (see FIG. 3) of igniter electrode 60 and ground electrode 48 is about 29%, or less than one-third of the spacing A between live electrode 46 and ground electrode 48. Further, the distance (B–C) between igniter electrode 60 and gas in recess 66 is one-third of the distance (A–D) between live electrode 46 and gas in waveguide 34. A 100 (Megahertz) MHz RF signal of 600 watts power (the power normally required to sustain a discharge) was applied between electrodes 46 and 48, and accordingly to between electrodes 60 and 48; with gas pressure in waveguide channels of about 80 Torr; and with similar igniter arrangements 22 on each of waveguides 30 and 32. Under these conditions it was found that a discharge would ignite in recesses 66 of the igniter arrangements, and that electrons and ions created by the discharge to spread throughout the waveguide channels. In the absence of the inventive igniter arrangements it would have been necessary to apply a short duration RF pulse having a peak power at least twice that of the discharge sustaining RF power to ignite the discharge in the waveguide channels.

It should be noted here that while discharge sustaining electrodes 46 and 48 are indicated as being continuous in extent, they may be separated into two or more closely spaced pairs, separated by a shield, for reducing electrode capacitance. Such an electrode arrangement is disclosed in PCT Application No. WO 02/05396, the complete disclosure of which is hereby incorporated by reference. It should further be noted that while waveguide channels 30, 32, and 34 are described herein as being of uniform width, they may be tapered along their length, such that at a constant depth the discharge volume increases with waveguide length. Such an electrode arrangement can be used to shorten the overall length of a folded waveguide laser and several such arrangements are described in U.S. patent application Ser. No. 10/277,272, filed Oct. 21, 2002, the complete disclosure of which is also hereby incorporated by reference.

The present invention is described above in terms of a preferred and other embodiments. The invention, however, is not limited to the embodiments described or depicted. Rather, the invention is limited only to the claims appended hereto. For example, while the igniter electrode 60 is illustrated as a separated element connected to the electrode 46, it could be also be formed integrally with or be defined by an extension of electrode 46.

What is claimed is:

1. A waveguide gas laser comprising:

an enclosure filled with a lasing gas;

a waveguide structure within said enclosure, said waveguide structure including a rectangular ceramic block having first and second opposite surfaces and having a plurality of waveguide channels in said second surface arranged at an angle to each other in a zigzag arrangement and filled with the lasing gas of the enclosure;

first and second discharge-sustaining electrodes arranged parallel to each other on opposite sides of said ceramic block with said first and second electrodes facing said first and second surfaces respectively of said ceramic block for applying an electric field across said waveguide channels, said first and second electrodes spaced apart by a first distance;

at least one igniter arrangement associated with a selected one of said waveguide channels for igniting a discharge in said lasing gas in said waveguide channels, said igniter arrangement including a lateral extension extending from a wall of said selected waveguide channel laterally into said second surface of said ceramic block, said lateral extension being in gaseous communication with said selected waveguide channel and also filled with the lasing gas of the enclosure; and said igniter arrangement including an igniter electrode electrically connected to said first electrode and extending into a blind hole in said second surface of said ceramic block, said blind hole in overlapping alignment with said lateral extension of said selected waveguide channel and being spaced apart from said second electrode, said igniter electrode and said second electrode for applying an electric field across said lateral extension of said selected waveguide channel, said igniter electrode and said second electrode being spaced apart by a second distance, said second distance being less than said first distance so that when the electrodes are energized, the electrical field across the lateral extension is greater than in the waveguide channel thereby facilitating the ignition of the discharge.

2. The laser of claim 1, wherein said second distance is less than or equal to about one-half of said first distance.

3. The laser of claim 1, wherein said waveguide channels have a first depth and said lateral extension has a second depth, said second depth being less than said first depth.

4. The laser of claim 1, wherein said first electrode is at a third distance from said selected waveguide channel and said igniter electrode is at a fourth distance from said lateral extension of said selected waveguide channel and said fourth distance is less than said third distance.

5. The laser of claim 1, wherein there is a plurality of igniter arrangements, one thereof associated with each of said waveguide channels.

6. The laser of claim 5, wherein are three waveguide channels and three igniter arrangements.

7. The laser of claim 1, wherein said igniter electrode is a metal plug inserted into said first electrode.

8. The laser of claim 7, wherein said igniter electrode is in electrical contact with a base of said blind hole in said ceramic block.

9. The laser of claim 1, wherein said first and second electrodes are in physical contact with said first and second surfaces of said ceramic block.

10. The laser of claim 1, wherein said lasing gas includes $CO_2$.

11. A waveguide gas laser, comprising:

an enclosure filled with a lasing gas;

a waveguide structure within said enclosure, said waveguide structure including a rectangular ceramic block having first and second opposite surfaces and having a plurality of waveguide channels in said second surface arranged at an angle to each other in a zigzag arrangement and filled with the lasing gas of the enclosure;

first and second discharge-sustaining electrodes arranged parallel to each other on opposite sides of said ceramic block with said first and second electrodes in contact with said first and second surfaces respectively of said ceramic block for applying an electric field across said waveguide channels, said first and second electrodes spaced apart by a first distance equal to the thickness of said ceramic block;

at least one igniter arrangement associated with a selected one of said waveguide channels for igniting a discharge in said lasing gas in said waveguide channels;

said igniter arrangement including a lateral extension extending from a wall of said selected waveguide channel laterally into said second surface of said ceramic block, said lateral extension being in gaseous communication with said selected waveguide channel and also filled with the lasing gas of the enclosure;

said igniter arrangement further including an igniter electrode electrically connected to said first electrode and extending into a blind hole in said second surface of said ceramic block, said blind hole in overlapping alignment with said lateral extension of said selected waveguide channel and being spaced apart from said second electrode, said igniter electrode and said second electrode for applying an electric field across said lateral extension of said selected waveguide channel, said igniter electrode and said second electrode being spaced apart by a second distance, and wherein said first electrode is at a third distance from said selected waveguide channel and said igniter electrode is at a fourth distance from said lateral extension of said selected waveguide channel and said second distance being less than one half of said third distance, said fourth distance is less than or equal to about one half said third distance so that when the electrodes are energized, the electrical field across the lateral extension is greater than in the waveguide channel thereby facilitating the ignition of the discharge.

12. In a waveguide gas laser including an enclosure filled with a lasing gas at a lasing gas pressure, a waveguide structure within the enclosure including a rectangular ceramic block having a plurality of waveguide channels therein arranged at an angle to each other in a zigzag arrangement and filled with the lasing gas of the enclosure, a method of operating the laser, comprising the steps of:

providing a lateral extension in at least a selected one of the waveguide channels, the lateral extension extending from a wall of the selected waveguide channel laterally into the ceramic block and being in gaseous communication with the selected waveguide channel and thereby being filled with the lasing gas of the enclosure; and applying a first electric field across the lateral extension of the selected waveguide channel while simultaneously applying a second electric field smaller than the first electric field across the selected waveguide channel.

13. The method of claim 12, wherein the first electric field is sufficient to ignite a discharge in the lasing gas in the lateral extension of the selected waveguide at the lasing gas pressure, wherein said lateral extension is arranged such that a discharge ignited therein spreads into the lasing gas in the selected waveguide channel, and wherein the second electric field is sufficient to sustain the discharge in the lasing gas in the selected waveguide channel at the lasing gas pressure.

14. The method of claim 12, wherein the electric field across the lateral extension of the selected waveguide channel is about equal to or greater than twice the electric field across the selected waveguide channel.

15. The method of claim 12, wherein a lateral extension is provided in each of the waveguide channels and the first electric field is applied across each thereof.

16. A waveguide gas laser comprising:

an enclosure filled with a lasing gas;

a planar ceramic block, said ceramic block having at least one waveguide channel formed therein;

first and second opposed electrodes mounted on opposite sides of said ceramic block for energizing the laser gas;

an igniter arrangement including:

an open region formed in the ceramic block in fluid communication with the waveguide channel;

a blind hole formed in the ceramic block in vertical alignment with at least a portion of said open region; and an igniter electrode electrically coupled to the first electrode and extending into said blind hole towards said second electrode so that the spacing between the end of the igniter electrode and the second electrode is less than the distance between the first and second electrodes so that when the electrodes are energized, the electrical field in the open region is greater than in the waveguide channel thereby facilitating the ignition of the discharge.

17. The laser of claim 16, wherein said distance between the end of the igniter electrode and the second electrode is less than or equal to about one-half of the distance between the first and second electrodes.

18. The laser of claim 16, wherein said igniter electrode is a metal plug inserted into said first electrode.

19. The laser of claim 16, wherein the end of the igniter electrode is in electrical contact with a base of said blind hole in said ceramic block.

* * * * *